No. 722,612. PATENTED MAR. 10, 1903.
B. NADALL.
TIRE FOR WHEELS OF ROAD VEHICLES.
APPLICATION FILED JULY 22, 1902.
NO MODEL.

Witnesses:
James L. Norris Jr.
Robert Everett

Inventor
Berne Nadall.
By James L. Norris
Atty.

UNITED STATES PATENT OFFICE.

BERNE NADALL, OF KINGSTON-UPON-THAMES, ENGLAND.

TIRE FOR WHEELS OF ROAD-VEHICLES.

SPECIFICATION forming part of Letters Patent No. 722,612, dated March 10, 1903.

Application filed July 22, 1902. Serial No. 116,583. (No model.)

*To all whom it may concern:*

Be it known that I, BERNE NADALL, a citizen of the United States, residing at Kingston-upon-Thames, England, have invented new and useful Improvements in Tires for the Wheels of Road-Vehicles, of which the following is a specification.

This invention relates to inner-tube pneumatic rubber tires for the wheels of ordinary road-carriages, wagons, motor-cars, and other heavy or comparatively heavy road-vehicles; and the said invention consists, essentially, in arranging in combination with such tires metal springs shaped substantially as hereinafter described, which springs by their resilience assist in absorbing shocks, especially those received laterally, which are particularly destructive to rubber tires as heretofore ordinarily arranged, and also assist in retaining the rubber tires in place on the wheels. The said spring consists of a hoop or endless band of sheet-steel corrugated in the direction of its length, so that in transverse section the said band has the shape of an arch with feet projecting laterally outward. The said spring is placed around the wheel-rim and secured thereto by heating and shrinking, as in the case of ordinary metal tires, and where deemed desirable it is further secured by screws or other suitable fastenings. The pneumatic rubber tire bears on the aforesaid spring and is retained in position by metal rings secured one on each side of the wheel-rim by means of suitable fastenings, such as screw-bolts, so as to form flanges, between which the tire is confined.

Figure 1:
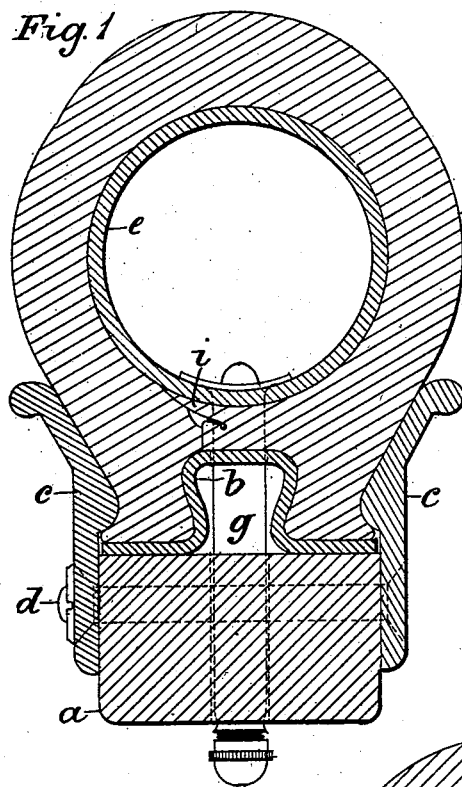
Figure 3:
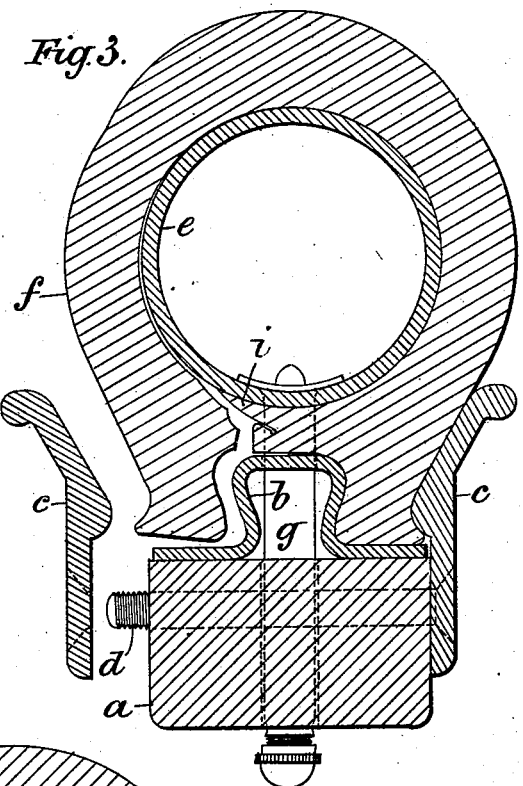
Figure 2:
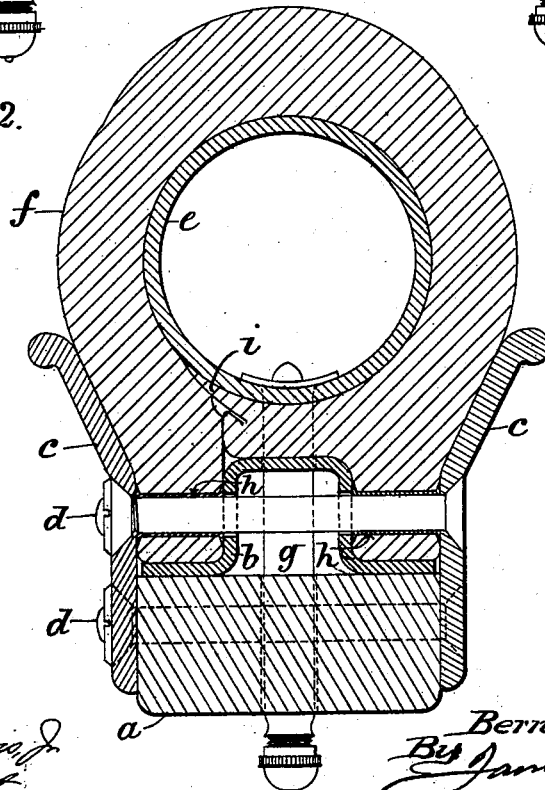

Figure 1 of the accompanying drawings is a transverse section of a portion of a wheel having applied to it an inner-tube detachable pneumatic rubber tire in combination with a spring according to my said invention. Fig. 2 is a similar section illustrating another mode of application of my invention. Fig. 3 illustrates the manner in which access may be obtained to the air-tube of the tire illustrated in Fig. 1.

In all the said figures the wheel-rim is marked $a$, the aforesaid spring $b$, the flanges $c\ c$, the bolts securing the said flanges $d\ d$, the air-tube of the pneumatic tire $e$, and the outer cover thereof, $f$. The position of the inflation-valve is illustrated at $g$. The sides of the corrugation or arched part of the spring $a$ may overhang the laterally-projecting foot parts, so as to form a dovetail, with which the tire may be held in engagement by means of the flanges $c\ c$, substantially as illustrated in Figs. 1 and 3, or the sides of the corrugation or arched part of the said spring may be otherwise formed. In either case the flange-holding bolts $d\ d$ may be passed through holes formed in the tire-cover and the spring $b$ and flanges $c\ c$, substantially as illustrated in Fig. 2, the bolt-holes in the tire being by preference bushed or lined by securing metal tubes $h\ h$ in them, as illustrated in the said Fig. 2.

Access to the air-tube is obtained when requisite by separating one of the flanges $c\ c$ from the wheel and pulling the tire-cover outward on the same side. (See Fig. 3.)

The small flap $i$ projecting from one side of the opening, part of the cover $f$ of the pneumatic tire, and the chamfer of the corresponding portion of the opposite side of the said part admit of the said cover being readily closed without risk of pinching the air-tube $e$ between the closing-faces of the said cover.

The engagement of the outer covers of pneumatic tires with wheels by the means hereinbefore described is accompanied by the advantage that the said covers are retained in place quite independently of any binding action of the inflated tubes.

What I claim, and desire to secure by Letters Patent of the United States, is—

1. The combination of a wheel-rim, a metallic spring corrugated in the direction of its length to form a rib, a tire adapted to fit over said rib, side pieces or flanges attached to said rim, and bolts passing through said side pieces and through the lower portions of said tire and said rib, substantially as described.

2. The combination of a wheel-rim, a metallic spring corrugated in the direction of its length to form a rib, a tire adapted to fit over said rib, metallic tubes extending through the lower portions of said tire, side pieces or flanges attached to said rim, and bolts passing through said side pieces and through the metallic tubes in said tire and through said rib, substantially as described.

3. The combination of a wheel-rim, a metallic spring, corrugated in the direction of its length to form a rib, the walls of said rib being flared outwardly so as to produce overhanging portions, a tire adapted to fit over said rib, metallic tubes extending through the lower portions of said tire, side pieces or flanges attached to said rim, and bolts passing through said side pieces and through the metallic tubes in said tire, substantially as described.

4. The combination of a wheel-rim, a metallic spring corrugated in the direction of its length to form a rib, a tire adapted to fit over said rib, the cover of said tire being divided and one side of said divided portion being provided with the flap $i$, for the purpose specified, and side pieces or flanges attached to said rim and embracing the sides of said tire, substantially as described.

BERNE NADALL.

Witnesses:
WILLIAM HOLMES,
ERNEST CHARLES ERRINGTON.